United States Patent
Song et al.

(10) Patent No.: US 10,924,935 B2
(45) Date of Patent: Feb. 16, 2021

(54) METHOD AND DEVICE FOR DETERMINING MULTI-USER TRANSMISSION MODE

(71) Applicant: CHINA ACADEMY OF TELECOMMUNICATIONS TECHNOLOGY, Beijing (CN)

(72) Inventors: Yang Song, Beijing (CN); Shaoli Kang, Beijing (CN); Bin Ren, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 13 days.

(21) Appl. No.: 16/065,033

(22) PCT Filed: Nov. 17, 2016

(86) PCT No.: PCT/CN2016/106193
§ 371 (c)(1),
(2) Date: Jun. 21, 2018

(87) PCT Pub. No.: WO2017/107707
PCT Pub. Date: Jun. 29, 2017

(65) Prior Publication Data
US 2018/0375551 A1     Dec. 27, 2018

(30) Foreign Application Priority Data
Dec. 22, 2015   (CN) .......................... 2015 1 0975099

(51) Int. Cl.
*H04W 72/12*     (2009.01)
*H04B 7/0413*   (2017.01)
(Continued)

(52) U.S. Cl.
CPC .......... *H04W 16/10* (2013.01); *H04B 7/0413* (2013.01); *H04B 7/0452* (2013.01);
(Continued)

(58) Field of Classification Search
CPC .. H04B 7/0452; H04B 7/0413; H04B 7/0669; H04B 7/0617; H04B 7/0456;
(Continued)

(56) References Cited

U.S. PATENT DOCUMENTS

2009/0052571 A1     2/2009 Liu et al.
2012/0213169 A1     8/2012 Wang et al.
(Continued)

FOREIGN PATENT DOCUMENTS

CN     101374033 A     2/2009
CN     101667896 A     3/2010
(Continued)

OTHER PUBLICATIONS

International Search Report for PCT/CN2016/106193 dated Feb. 7, 2017 and its English translation provided by WIPO.
(Continued)

*Primary Examiner* — Joshua Kading
(74) *Attorney, Agent, or Firm* — Ladas & Parry, LLP

(57) ABSTRACT

A method and a device for determining multi-user transmission mode are provided. The method includes: grouping terminals based on channel spatial characteristics of the terminals; allocating data transmission modes to the terminals, where data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode.

11 Claims, 2 Drawing Sheets

(51) Int. Cl.

| | | |
|---|---|---|
| *H04B 7/0452* | (2017.01) | |
| *H04W 72/08* | (2009.01) | |
| *H04W 72/04* | (2009.01) | |
| *H04L 5/00* | (2006.01) | |
| *H04B 7/06* | (2006.01) | |
| *H04W 16/10* | (2009.01) | |
| *H04W 74/02* | (2009.01) | |
| *H04W 74/00* | (2009.01) | |
| *H04W 16/24* | (2009.01) | |
| *H04W 16/18* | (2009.01) | |

(52) U.S. Cl.
CPC ......... *H04B 7/0689* (2013.01); *H04L 5/0025* (2013.01); *H04L 5/0026* (2013.01); *H04L 5/0037* (2013.01); *H04L 5/0042* (2013.01); *H04W 16/18* (2013.01); *H04W 16/24* (2013.01); *H04W 72/042* (2013.01); *H04W 72/044* (2013.01); *H04W 72/08* (2013.01); *H04W 72/121* (2013.01); *H04W 72/1215* (2013.01); *H04W 72/1226* (2013.01); *H04W 72/1263* (2013.01); *H04W 72/1289* (2013.01); *H04W 74/006* (2013.01); *H04W 74/008* (2013.01); *H04W 74/02* (2013.01)

(58) Field of Classification Search
CPC ... H04L 5/0037; H04L 5/0026; H04L 5/0051; H04L 5/0025; H04W 16/10; H04W 72/044; H04W 72/08; H04W 72/1263; H04W 72/121
See application file for complete search history.

(56) References Cited

U.S. PATENT DOCUMENTS

| | | | | |
|---|---|---|---|---|
| 2014/0233407 | A1* | 8/2014 | Pourahmadi | H04W 72/082 370/252 |
| 2014/0314006 | A1 | 10/2014 | Suh et al. | |
| 2015/0358064 | A1 | 12/2015 | Benjebbour et al. | |
| 2016/0029350 | A1 | 1/2016 | Kishiyama et al. | |
| 2016/0174230 | A1 | 6/2016 | Benjebbour et al. | |

FOREIGN PATENT DOCUMENTS

| | | | |
|---|---|---|---|
| CN | 101668338 | A | 3/2010 |
| CN | 101997655 | A | 3/2011 |
| CN | 102387598 | A | 3/2012 |
| CN | 104811289 | A | 7/2015 |
| CN | 104871464 | A | 8/2015 |
| CN | 105763301 | A | 7/2016 |
| EP | 2955952 | A1 | 12/2015 |
| WO | 2014208140 | A1 | 12/2014 |

OTHER PUBLICATIONS

Written Opinion of the International Search Authority PCT/CN2016/106193 dated Feb. 7, 2017 and its English translation provided by Google Translate.

NTT DOCOMO, Inc., "Justification for NOMA in New Study on Enhanced Multi-User Transmission and Network Assisted Interference Cancellation for LTE", 3GPP TSG RAN meeting #66 R2-141936, Dec. 2, 2014 (Dec. 2, 2014), the main body, pp. 1, 3, 5, 7 and 15.

NTT DOCOMO, Inc., "Justification for NOMA in New Study on Enhanced MLJ-MIMO and Network Assisted Interference Cancellation", 3GPP TSG RAN meeting #65 RP-141165, Sep. 2, 2014 (Sep. 2, 2014), the main body, pp. 1-13.

From EP 16877518.7, Extended European Search Report, dated Nov. 12, 2018.

From PCT/CN2016/106193, Written Opinion of the International Searching Authority, dated Feb. 7, 2017, with English translation from WIPO.

From PCT/CN2016/106193, International Preliminary Report of Patentability, dated Jun. 26, 2018, with English translation from WIPO.

Zeng Jie et al., "Pattern division multiple access (PDMA) for cellular future radio access", 2015 International Conference on Wireless Communications & Signal Processing (WCSP), Oct. 15, 2015, pp. 1-5.

Dai Linglong et al., "Non-Orthogonal multiple access for 5G: solutions, challenges, opportunities, and future research trends", IEEE Communications Magazine, vol. 53, No. 9, Sep. 1, 2015, pp. 74-81.

From TW 105139621, office action and search report dated Jan. 18, 2018 with machine English translation.

Kim, B. et al., "Non-orthogonal multiples access in a downlink multiuser beamforming system", in Proc. IEEE Military Communicatoin Conf., Nov. 2013, pp. 1278-1283.

First Office Action from CN app. No. 201510975099.1, dated Sep. 4, 2019, with English translation from Global Dossier.

"PDMA pattern segmentation multiple access technology for 5G", China Academic Journal, May 31, 2015, pp. 43-47, with English translation from Google Translate.

Second Office Action and search report from CN app No. 201510975099.1, dated Mar. 4, 2020.

* cited by examiner

METHOD AND DEVICE FOR DETERMINING MULTI-USER TRANSMISSION MODE

CROSS-REFERENCE TO RELATED APPLICATIONS

The present application is the I.S, national phase of PCT Application PCT/CN2016/106193 filed on Nov. 17, 2016, which claims a priority to the Chinese patent application No. 201510975099.1 filed on Dec. 22, 2015, the disclosures of which are incorporated herein by reference in their entireties.

TECHNICAL FIELD

The present disclosure relates to the field of the wireless communication technology, and in particular to a method and a device for determining multi-user transmission mode.

BACKGROUND

Compared with the mobile communication systems in the related art, the 5th generation mobile communication proposes higher spectral efficiency requirements. Large-scale antenna technologies and non-orthogonal multiple access technologies are considered by the industry to be the enabling technologies for improving spectral efficiency. Among them, large-scale antenna technology is the most effective technology for improving spectral efficiency. Supporting more than 128 channels of multiple antennas may improve the spectral efficiency of the system by 3 to 10 times. The non-orthogonal multiple access technology is an enhanced type of spectral efficiency enhancement, which may increase the spectrum efficiency of the system by 30-100%. At present, the 5th generation mobile communication system has discussed the joint use of large-scale antenna technology and non-orthogonal multiple access technology.

Large-scale antenna technology may further improve the spatial isolation between terminals and distinguish terminals in the spatial space. Therefore, compared to large-scale antenna technology, although the combination of large-scale antenna technology and non-orthogonal multiple access technology may bring about a certain increase in system capacity, but its shortcoming is, the complexity of the former is increased than the latter significantly, which makes the combination of the two technologies combined is somewhat not worth the candle.

SUMMARY

The present disclosure provides a method and a device for determining multi-user transmission mode, so as to provide a technical solution that can reduce complexity when combining a large-scale antenna technology and a non-orthogonal multiple access technology.

A method for determining a multi-user transmission mode is provided in the preset disclosure, including: grouping terminals based on channel spatial characteristics of the terminals; allocating data transmission modes to the terminals, where data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode.

Optionally, in the case of performing the data transmission of the terminals in different groups on the identical scheduling time-frequency resource and in the MU-MIMO mode, the terminals in the identical group using different non-orthogonal multiple access resources have identical or similar Multiple-Input Multiple-Output (MIMO) precodes or beamforming on a time-frequency resource.

Optionally, in the case of performing the data transmission of the terminals in the identical group in the non-orthogonal multiple access mode, the method further includes: allocating different non-orthogonal multiple access resources to the terminals in the identical group; instructing, through signaling information, the terminals in the identical group to use different non-orthogonal multiple access resources.

Optionally, the method further includes: in the case that a base station transmits data on the scheduling time-frequency resource and in the data transmission mode allocated to the terminals, indicating non-orthogonal multiple access transmission information of the terminals through signaling information in the case that the terminals in the identical group share an identical Demodulation Reference Signal (DMRS) port; or in the case that the terminals in the identical group use different DMRS ports, indicating non-orthogonal multiple access transmission information of the terminals through signaling information or indicating the non-orthogonal multiple access transmission information of the terminals through DMRS signals.

Optionally, the method further includes: in the case that the base station transmits data to the terminals on the scheduling time-frequency resource and in the non-orthogonal multiple access mode, detecting in the non-orthogonal multiple access mode by the terminals, the data transmitted to the terminals, to confirm the data transmitted to the terminals.

Optionally, in the case that the terminals detect in the non-orthogonal multiple access mode the data transmitted to the terminals, the method further includes: processing the data transmitted to the terminals in other groups on the scheduling time-frequency resource by the base station as interferences.

Optionally, the method further includes: in the case that the base station receives on the scheduling time-frequency resource data transmitted by the terminal, detecting in the MU-MIMO mode and the non-orthogonal multiple access mode by the base station, the data transmitted by the terminal, to confirm the data transmitted by the terminal.

Optionally, the non-orthogonal multiple access mode is a Pattern Division Multiple Access (PDMA) mode.

A device for determining a multi-user transmission mode is further provided in the present disclosure, including: a grouping module, configured to group terminals based on channel spatial characteristics of the terminals; an allocation module, configured to allocate data transmission modes to the terminals, where data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode.

Optionally, in the case of performing the data transmission of the terminals in different groups on the identical scheduling time-frequency resource and in the MU-MIMO mode, the terminals in the identical group using different non-orthogonal multiple access resources have identical or similar Multiple-Input Multiple-Output (MIMO) precodes or beamforming on a time-frequency resource.

Optionally, the device further includes: an instruction module, configured to, in the case of performing the data transmission of the terminals in the identical group in the non-orthogonal multiple access mode, allocate different non-orthogonal multiple access resources to the terminals in the identical group, and instruct, through signaling information, the terminals in the identical group to use different non-orthogonal multiple access resources.

Optionally, the instruction module is further configured to, in the case that a base station transmits data on the scheduling time-frequency resource and in the data transmission mode allocated to the terminals, indicate non-orthogonal multiple access transmission information of the terminals through signaling information in the case that the terminals in the identical group share an identical Demodulation Reference Signal (DMRS) port; or in the case that the terminals in the identical group use different DMRS ports, indicate non-orthogonal multiple access transmission information of the terminals through signaling information or indicate the non-orthogonal multiple access transmission information of the terminals through DMRS signals.

Optionally, the device further includes: a terminal receiving module, configured to, in the case that the base station transmits data to the terminals on the scheduling time-frequency resource and in the non-orthogonal multiple access mode, detect in the non-orthogonal multiple access mode the data transmitted to the terminals, to confirm the data transmitted to the terminals.

Optionally, the terminal receiving module is further configured to, in the case that the terminals detect in the non-orthogonal multiple access mode the data transmitted to the terminals, process the data transmitted to the terminals in other groups on the scheduling time-frequency resource by the base station as interferences.

Optionally, the device further includes: a base station receiving device, configured to, in the case that the base station receives on the scheduling time-frequency resource data transmitted by the terminal, detect in the MU-MIMO mode and the non-orthogonal multiple access mode, the data transmitted by the terminal, to confirm the data transmitted by the terminal.

Optionally, the allocation module is further configured to perform, in a Pattern Division Multiple Access (PDMA) mode, the data transmission of the terminals in an identical group on the scheduling time-frequency resource.

A device for determining a multi-user transmission mode is further provided in the present disclosure, including: a processor configured to read a program stored in a memory to: group terminals based on channel spatial characteristics of the terminals; allocate data transmission modes to the terminals, where data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode; a transceiver, configured to transmit data under a control of the processor to transmit and receive data during a data processing process.

According to the present disclosure, when the resources are allocated, the terminals are firstly grouped based on the channel spatial characteristics of the terminals, and then the resources are allocated to each group based on MU-MIMO, the terminals in the same group are allocated different non-orthogonal multiple access resources, so the two technologies of large-scale antennas and non-orthogonal multiple access may be most effectively combined to improve the spectrum efficiency of the system at the utmost extend in the case of minimizing the scheduling complexity and the receiving complexity as much as possible.

BRIEF DESCRIPTION OF THE DRAWINGS

The present disclosure will be described hereinafter in conjunction with the drawings and embodiments. The embodiments are for illustrative purposes only, but shall not be used to limit the scope of the present disclosure.

DETAILED DESCRIPTION

The present disclosure will be described hereinafter in a clear and complete manner in conjunction with the drawings and embodiments.

Large-scale antenna technology may further improve the spatial isolation between terminals and distinguish terminals in the spatial space. Therefore, compared to large-scale antenna technology, although the combination of large-scale antenna technology and non-orthogonal multiple access technology may bring about a certain increase in system capacity, but its shortcoming is, the complexity of the former is increased than the latter significantly, which makes the combination of the two technologies combined is somewhat not worth the candle. Therefore, under the premise of reducing scheduling complexity and receiving complexity as much as possible, how to effectively combine the two technologies and exert their respective advantages is an urgent problem to be solved.

Therefore, for a system combining multiple antennas and non-orthogonal multiple access, the present disclosure will provide in some embodiments solution where the terminals are grouped based on channel spatial characteristics thereof, and different schemes are used within a group and between groups, to effectively combine the two technologies, thereby not only increasing the spectral efficiency of the system but also reducing the implementation complexity of the system.

Specifically, the present disclosure provides in some embodiments an application mechanism that combines a large-scale antenna technology and a non-orthogonal multiple access technology, through the non-orthogonal multiple access technologies and MU-MIMO (Multi-User Multiple-Input) antenna system and the multi-terminal scheduling scheme, it is able to increase the terminal pairing probability, effectively use the spatial isolation, improve transmission performance, and reduce the base station scheduling complexity and receiver (uplink base station, downlink terminal) detection complexity. This scheme may be applied to the uplink of the communication system as well as to the downlink.

The embodiments of the present disclosure will be described in the following.

Figure 1:
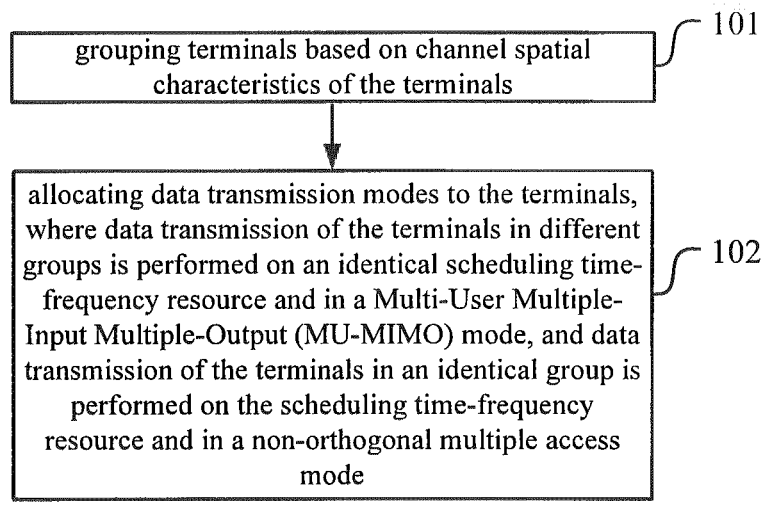
FIG. 1 is a flow chart of a method for determining a multi-user transmission mode in some embodiments of the present disclosure.

FIG. 1 is a flow chart of a method for determining a multi-user transmission mode in some embodiments of the present disclosure. The method includes:

Step 101: grouping terminals based on channel spatial characteristics of the terminals;

Step 102: allocating data transmission modes to the terminals, where data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode.

In Step 101, the terminals are grouped based on channel spatial characteristics of the terminals and the terminals having the similar channel spatial characteristics may be arranged in the same group. The way to determine whether the terminals have the similar channel spatial characteristics is that, for example, if the correlation coefficients of the channels of the two terminals are greater than a certain threshold, they are similar or they feed back the same or similar PMI.

To be specific, the base station side groups terminals based on the channel spatial characteristics of the terminals, and the terminals whose channel characteristics are close to each other (that is, the spatial isolation is low) are arranged into a group, and the terminals whose channel characteristics are relatively different (that is, the spatial isolation is high) are arranged into different groups. The spatial isolation refers to the correlation of channel characteristics between any two terminals. The smaller the correlation, the greater the spatial isolation may be. The terminals whose correlation of channel characteristics are greater than a certain threshold are arranged in the same group. In this way, N groups of terminals can be formed for all the terminals covered by the base station; alternatively, the channel spatial characteristics may be quantized, and the terminals having the same or similar quantized results may be arranged into the same group. For example, the channel characteristics may be a channel correlation matrix, channel feature vectors, etc.

In some embodiments of the present disclosure, when it is necessary to determine terminals that use the same time-frequency resource for data transmission, the base station side may determine the terminal needs to perform uplink/downlink transmission on a certain time-frequency resource currently based on the uplink/downlink scheduling application, service type, service buffer report, or some prior information of the terminal and the channel state information of these terminals.

In some embodiments of the present disclosure, the non-orthogonal multiple access mode may be a PDMA (Pattern Division Multiple Access) mode. The PDMA will be specifically described with examples in the following.

In Step 102, in the case of performing the data transmission of the terminals in different groups on the identical scheduling time-frequency resource and in the MU-MIMO mode, for the scheduling time-frequency resources, based on the time-frequency resources used by the PDMA, one terminal may uses a part of the time-frequency resources of the scheduling time-frequency resources. For example, in the case that the scheduling time-frequency resources are PRBs (Physical Resource Blocks) 1 to 6, and multiple groups of users adopting MU-MIMO all occupy these scheduling time-frequency resources. A plurality of terminals in the group may use the following PDMA 3×7 matrix:

$$H_{PDMA3\times 7} = \begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix},$$

to allocate non-orthogonal resources (the non-orthogonal resources of the PDMA includes: time-frequency resources, PDMA code word resources, power resources, etc.), and then terminal 1 uses code word 2 and occupies PRBs 1, 2, 3 and 4 (2 PRBs are 1 non-orthogonal frequency domain basic resource); terminal 2 uses code word 3 and occupies PRBs 1, 2, 5 and 6; terminal 3 uses code word 4 and occupies PRBs 3, 4, 5, 6; terminal 4 uses code word 5 and occupies PRBs 1, 2; terminal 5 uses code word 6 and occupies PRBs 3, 4; terminal 6 uses code word 7 and occupies PRBs 5, 6.

In some embodiments of the present disclosure, the term "time-frequency resource" will be used in the present disclosure. From the above, it can be seen that "time-frequency resource" refers to one or a part of the scheduling time-frequency resources, such as a certain PRB in the above example.

In the above Step 102 of allocating resources for data transmission for the terminals, the following principles are followed when determining terminal pairing:

The pairing of the terminals in different groups adopt the MU-MIMO mode, that is, the signals of the inter-group terminals are distinguished based on the spatial domain, the inter-group terminal does not need to consider the non-orthogonal multiple access resources (including the power domain and code domain of the non-orthogonal multiple access, etc.) allocation. Of course, it also means that the inter-group terminals may use the same non-orthogonal multiple access power domain resources, code word domain resources, and other resources.

The pairing of the terminals in the same group adopts the non-orthogonal multiple access mode, that is, different non-orthogonal multiple access power domain and code word domain resources are allocated to the terminals based on the MIMO precoding (uplink MIMO precoding/downlink MU-MIMO precoding), to distinguish the terminals through different non-orthogonal multiple access resources.

Different groups of terminals may be allocated the non-orthogonal multiple access resources respectively.

In some embodiments of the present disclosure, in the case of performing the data transmission of the terminals in different groups on the identical scheduling time-frequency resource and in the MU-MIMO mode, the terminals in the identical group using different non-orthogonal multiple access resources have identical or similar Multiple-Input Multiple-Output (MIMO) precodes or beamforming on a time-frequency resource. That is, the MIMO precodes or beamforming of the users in the same group and using different non-orthogonal multiple access resources on a time-frequency resource are identical or similar. Meanwhile, as described above, the time-frequency resource is one or a part of the scheduling time-frequency resource, such as a certain PRB.

In some embodiments of the present disclosure, in the case of performing the data transmission of the terminals in the identical group in the non-orthogonal multiple access mode, the method further includes: allocating different non-orthogonal multiple access resources to the terminals in the identical group; instructing, through signaling information, the terminals in the identical group to use different non-orthogonal multiple access resources.

In some embodiments of the present disclosure, the method further includes: in the case that a base station transmits data on the scheduling time-frequency resource and in the data transmission mode allocated to the terminals, indicating non-orthogonal multiple access transmission information (e.g., the power and constellation phase rotation information) of the terminals through signaling information in the case that the terminals in the identical group share an identical downlink Demodulation Reference Signal (DMRS) port, or indicating non-orthogonal multiple access transmission information of the terminals through signaling information in the case that the terminals in the identical group use different down link DMRS ports, or indicating the non-orthogonal multiple access transmission information of the terminals through downlink DMRS signals.

To be specific, in a DMRS port allocation mode, for a case in which data is transmitted to each terminal through the downlink, the terminals in the same group may share the same downlink DMRS port. In this case, the signaling needs to indicate the corresponding power and modulation constellation phase rotation information of each terminal in addition to the above PDMA code word. The advantage is that the downlink DMRS overhead is saved but the signaling overhead is needed.

In the case that the terminals in the same group uses different downlink DMRS ports, it is not needed to indicate the power and modulation constellation phase rotation information of each terminal through the signaling information, but the downlink DMRS of a certain terminal includes the power and constellation phase rotation information allocated to the terminal and the precoding information of the terminal. The advantage is that the signaling overhead is small, but the downlink DMRS overhead increases.

Alternatively, in the case that the base station receives the data sent by each terminal based on the scheduling time-frequency resource, different uplink DMRS resources are allocated to the terminals.

For a better understanding of the above embodiments, the following description will be given by examples.

Figure 2:
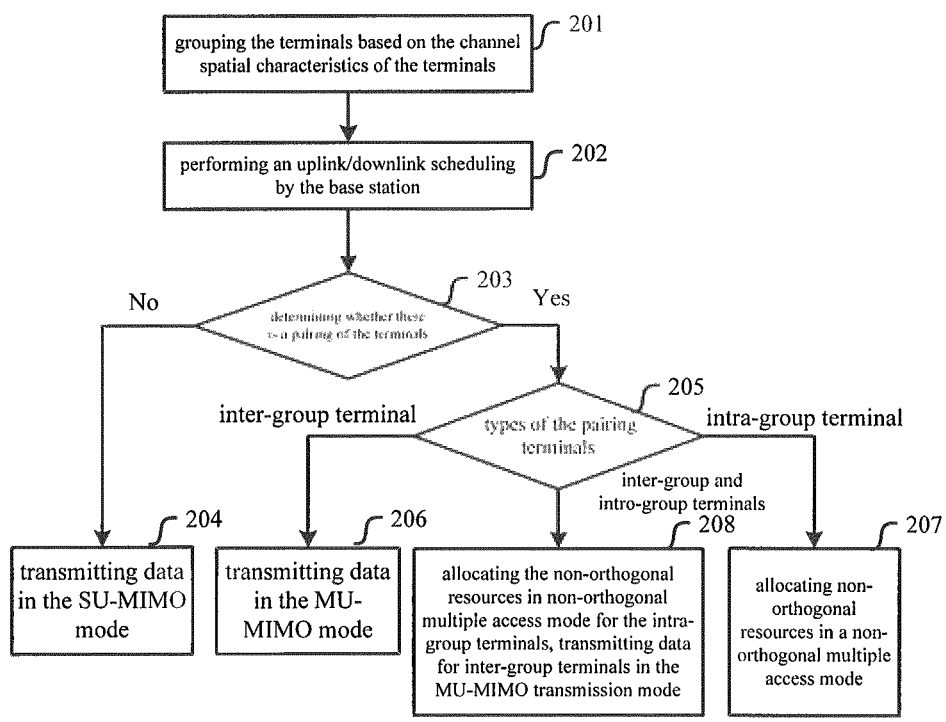
FIG. 2 is a schematic view of a combination of the large-scale antenna technology and the non-orthogonal multiple access technology in some embodiments of the present disclosure.

FIG. 2 is a schematic view of a combination of the large-scale antenna technology and the non-orthogonal multiple access technology in some embodiments of the present disclosure. As shown in FIG. 2, the method includes:

Step 201: grouping the terminals based on the channel spatial characteristics of the terminals;

Step 202: performing an uplink/downlink scheduling by the base station;

Step 203: determining whether there is a pairing of the terminals. If yes, the process proceeds to Step 205; otherwise, the process proceeds to Step 204;

Step 204: transmitting data in the SU-MIMO mode, i.e., in the case of determining that there is no terminal needing to use the same scheduling time-frequency resource for the data transmission, d transmitting data for the terminal in the SU-MIMO transmission mode;

Step 205: determined the types of the pairing terminals, where the process proceeds to Step 206 in the case that only the inter-group terminals are scheduled, the process proceeds to Step 207 in the case that only the terminals in the same group are scheduled, and the process proceeds to Step 208 in the case that both the inter-group terminals and the terminals in the same group are scheduled;

Step 206: transmitting data for multiple terminals in the MU-MIMO transmission mode;

Step 207: allocating non-orthogonal resources in a non-orthogonal multiple access mode and transmitting data for multiple terminals.

Step 208: allocating the non-orthogonal resources in non-orthogonal multiple access mode for the intra-group terminals and transmitting data for the intra-group terminals: transmitting data for inter-group terminals in the MU-MIMO transmission mode.

In the above embodiment, the inter-group terminals refer to multiple terminals belonging to different groups, the intra-group terminals refer to multiple terminals belonging to the same group, and the intra-group and inter-group terminals refer to multiple terminals belonging to the same group and multiple terminals belonging to different groups. FIG. 2 shows the scheduling results in different cases.

Step 204 refers to a case where only one user is scheduled and the data transmission is performed in the SU-MIMO mode.

Step 206 refers to a case where multiple users belonging to different groups are scheduled and the data transmission is performed in the MU-MIMO mode.

Step 207 refers to a ease where multiple users belonging to the same group are scheduled and the data transmission is performed in the PDMA mode.

Step 208 refers to a case where multiple users belonging to the same group and different groups, and the transmission is performed in the MU-MIMO mode and the PDMA mode.

After resources are allocated, the following describes the data transmission and reception between the base station and the terminal based on the resource allocation.

In order to better understand the embodiments of the present disclosure, it is assumed that there is the following implementation environment, and then the implementation of the base station transmitting and the terminal receiving and the terminal transmitting and the base station receiving will be separately described.

First, it is assumed that the non-orthogonal multiple access resources are selected from the following pattern division multiple access technology coding matrix in the code word domain.

$$H_{PDMA3\times 7} = \begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix}$$

The PDMA (Pattern Division Multiple Access) technology is a representative non-orthogonal multiple access technology. In the following embodiments, the PDMA technology is mainly used as an example to illustrate, but this does not mean that the technical solutions provided in the embodiments of the present disclosure can only be used for the PDMA technology. In fact, based on the commonality of the non-orthogonal multiple access technologies, after understanding the technical principle of the present disclosure, those skilled in the art may make modification to the embodiments to enable the present disclosure to be applicable to other non-orthogonal multiple access technologies. The PDMA will be described briefly hereinafter.

The PDMA technology utilizes the asymmetry of multi-terminal channels, and achieves a multi-dimension non-orthogonal signal superposition transmission such as time-frequency domain, power domain and spatial domain and obtains a higher terminal multiplexing and diversity gain by designing a multi-terminal unequal diversity sparse pattern matrix and a coding modulation joint optimization scheme.

The PDMA technology may map multiple signal domains such as the coding domain, power domain, and spatial domain of time frequency resources to form a non-orthogonal feature pattern that distinguishes multiple terminals. For the coding domain, the basic concept thereof is that multiple terminals use the columns of the pattern matrix (i.e., PDMA pattern vectors) to transmit their own data on the same time-frequency resource in a superposition manner. For the power domain, the basic concept thereof is that multiple terminals occupy the same time-frequency resources but use different transmitting powers to transmit their own data in a superposition manner. For the spatial domain, the basic concept thereof is that multi-terminal data information is transmitted over multiple antennas in spatial in a superposition manner.

A PDMA basic transmission unit is a combination of resources such as time, frequency, PDMA pattern vector and DMRS. The basic units of the above four resources are defined as follows:

Firstly, the basic unit of the time-domain resources is one or more Orthogonal Frequency Division Multiplex (OFDM) symbols.

Secondly, the basic unit of the frequency domain resource is the frequency domain subcarrier group, and the number of subcarriers included in the frequency domain subcarrier group is an integral multiple of the number of rows of the PDMA pattern matrix.

Thirdly, the basic unit of the PDMA pattern vector resource is a certain column of a PDMA pattern matrix, i.e., a PDMA code word.

In some embodiments of the present disclosure, the method of determining the PDMA pattern matrix may include:

determine the number M of pattern vectors (PDMA code words) that actually multiplex N time-frequency resources, where $N+1 \leq M \leq 2^N-1$;

determining a second pattern matrix formed by a coding superposition when M patterns are multiplexed on the N time-frequency resources, based on the configured first pattern matrix formed by a coding superposition when the $2^N-1$ pattern vectors are multiplexed on the N time-frequency resources, where the columns (i.e., the pattern vector) of the first pattern matrix corresponds to different coding methods respectively and at least two columns thereof have unequal diversity degrees, and at least two columns of the second pattern matrix have unequal diversity degrees.

Specifically, for the determination and expression of the PDMA pattern matrix, reference may be made to related documents of the PDMA, e.g., the patent application "method and device for determining multi-user coding superimposition pattern matrix" with the application date of Dec. 19, 2014 and the application number of 201410806434.0.

Figure 3:
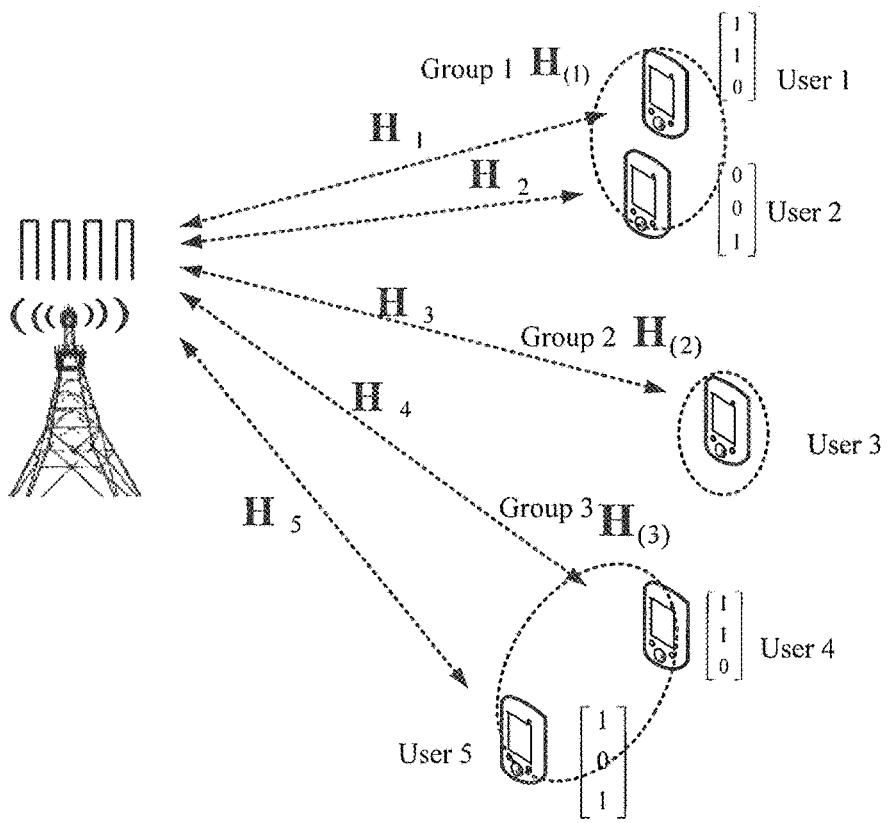
FIG. 3 is a schematic view of an implementation environment of the large-scale antenna technology and the non-orthogonal multiple access technology in some embodiments of the present disclosure.

FIG. 3 is a schematic view of an implementation environment of the large-scale antenna technology and the non-orthogonal multiple access technology. As shown in FIG. 3, there are five terminals in the environment, and the vector identifier next to the terminal is the PDMA code word of the terminal. Terminals in the dotted circles represent terminals belonging to the same group. Then, in combination with the above PDMA pattern matrix, the base station side groups the terminals based on the channel spatial characteristics of the terminals, the channel matrices of terminal 1 and terminal 2 are $H_1$ and $H_2$, respectively, and the channel spatial characteristics of the two are similar, they are arranged into groups 1 and the channel characteristic matrix is $H_{(1)}$. The channel matrixes of the terminal 4 and the terminal 5 are $H_4$ and $H_5$ respectively, the channel spatial characteristics of the two terminals are similar, and they are arranged into groups 3, and the channel characteristic matrix is $H_{(3)}$. The channel matrix of the terminal 3 is $H_2$, the terminal 3 is arranged into groups 2, and the channel characteristic matrix is $H_{(2)}$.

In the first case, the base station transmits data, and the terminal receives data.

In the case that the base station transmits data to the terminals on the scheduling time-frequency resource and in the non-orthogonal multiple access mode, the terminals detect in the non-orthogonal multiple access mode, the data transmitted to the terminals, to confirm the data transmitted to the terminals.

In some embodiments of the present disclosure, it is assumed that after one downlink scheduling, the base station needs to transmit data to five terminals at the same time-frequency resources at the same time.

Inter-group terminal processing: the base station performs MU-MIMO precoding/beamforming based on the channel characteristic matrices of the three groups, e.g., performing a Zero Forcing Beamforming (ZFBF) for a synthesized multi-terminal channels $[H_{(1)}{}^T, H_{(2)}{}^T, H_{(3)}{}^T]^T$.

Intra-group terminals processing: the base station allocates different non-orthogonal multiple access resources to terminal 1 and terminal 2 in group 1, for example, allocates PDMA code words $[1,1,0]^T$ to terminal 1 and allocates PDMA code words $[0, 0, 1]^T$ to terminal 2. The base station allocates different non-orthogonal multiple access resources for terminal 4 and terminal 5 in group 3, and the non-orthogonal multiple access resources may be different from or the same with those allocated to the terminals in other groups. For example, the PDMA code words $[1,1,0]^T$ is allocated to terminal 4, the PDMA code word $[1,0,1]^T$ is allocated to terminal 5. The entire scheduling time-frequency resource is allocated to terminal 3.

Terminal detection: Each terminal that uses PDMA transmission mode only needs to detect the data of the terminal in the group in the PDMA detection mode. The PDMA detection mode may be, e.g., the Belief Propagation (BP) and IDD Iterative Detection and Decoding (IDD), etc.

The data of the terminals in other groups may be processed as interferences, such as using an Interference Rejection Combining (IRC) receiver. That is, when each terminal performs detection based in a non-orthogonal multiple access mode, the method may further include: processing data transmitted on the resources allocated to other groups as interferences.

That is, in the case that the base station transmits data to the terminals on the scheduling time-frequency resource and in the non-orthogonal multiple access mode, the terminals detect in the non-orthogonal multiple access mode, the data transmitted to the terminals, to confirm the data transmitted to the terminals.

Furthermore, in some embodiments of the present disclosure, in the case that the terminals detect in the non-orthogonal multiple access mode the data transmitted to the terminals, the method further includes: processing the data transmitted to the terminals in other groups on the scheduling time-frequency resource by the base station as interferences.

In the second case, the terminal transmits data, and the base station receives data.

In the case that the base station receives on the scheduling time-frequency resource data transmitted by the terminal, the base station detects in the MU-MIMO mode and the non-orthogonal multiple access mode, the data transmitted by the terminal, to confirm the data transmitted by the terminal.

In some embodiments of the present disclosure, it is assumed that after one uplink scheduling, the base station needs to simultaneously receive the data transmitted by five terminals on the same time-frequency resource, and then:

Intra-group terminals processing: the base station allocates different non-orthogonal multiple access resources to terminal 1 and terminal 2 in group 1, for example, allocates PDMA code words $[1,1,0]^T$ to terminal 1 and allocates PDMA code words $[0, 0, 1]^T$ to terminal 2. The base station allocates different non-orthogonal multiple access resources to terminal 4 and terminal 5 in group 3, and the non-orthogonal multiple access resources may be different from or the same with those allocated to the terminals in other groups. For example, the PDMA code words $[1,1,0]^T$ is allocated to terminal 4, the PDMA code word $[1,0,1]^T$ is allocated to terminal 5. The entire scheduling time-frequency resource is allocated to terminal 3.

Multi-terminal detection: the base station performs the detection in the MU-MIMO mode and the PDMA mode based on the channel matrixes of five terminals.

Based on the same principle, a device for determining a multi-user transmission mode is further provided in some embodiments of the present disclosure.

Figure 4:
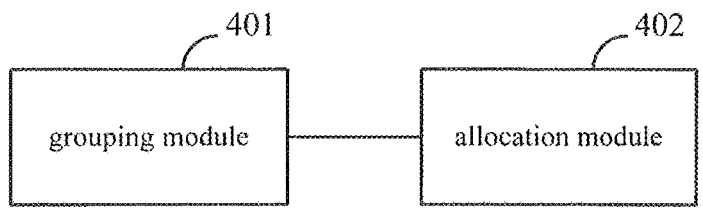
FIG. 4 is a schematic view of a device for determining a multi-user transmission mode in some embodiments of the present disclosure.

FIG. 4 is a schematic view of a device for determining a multi-user transmission mode in some embodiments of the present disclosure. As shown in FIG. 4, the device may include: a grouping module 401, configured to group terminals based on channel spatial characteristics of the terminals; an allocation module 402, configured to allocate data transmission modes to the terminals, where data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode.

In some embodiments of the present disclosure, in the case of performing the data transmission of the terminals in different groups on the identical scheduling time-frequency resource and in the MU-MIMO mode, the terminals in the identical group using different non-orthogonal multiple access resources have identical or similar Multiple-Input Multiple-Output (MIMO) precodes or beamforming on a time-frequency resource.

In some embodiments of the present disclosure, the device further includes: an instruction module, configured to, in the case of performing the data transmission of the terminals in the identical group in the non-orthogonal multiple access mode, allocate different non-orthogonal multiple access resources to the terminals in the identical group, and instruct, through signaling information, the terminals in the identical group to use different non-orthogonal multiple access resources.

In some embodiments of the present disclosure, the instruction module is further configured to, in the case that a base station transmits data on the scheduling time-frequency resource and in the data transmission mode allocated to the terminals, indicate non-orthogonal multiple access transmission information of the terminals through signaling information in the case that the terminals in the identical group share an identical Demodulation Reference Signal (DMRS) port; or in the case that the terminals in the identical group use different DMRS ports, indicate non-orthogonal multiple access transmission information of the terminals through signaling information or indicate the non-orthogonal multiple access transmission information of the terminals through DMRS signals.

In some embodiments of the present disclosure, the device further includes: a terminal receiving module, configured to, in the case that the base station transmits data to the terminals on the scheduling time-frequency resource and in the non-orthogonal multiple access mode, detect in the non-orthogonal multiple access mode the data transmitted to the terminals, to confirm the data transmitted to the terminals. In some embodiments of the present disclosure, the terminal receiving module is further configured to, in the case that the terminals detect in the non-orthogonal multiple access mode the data transmitted to the terminals, process the data transmitted to the terminals in other groups on the scheduling time-frequency resource by the base station as interferences.

In some embodiments of the present disclosure, the device further includes: a base station receiving device, configured to, in the case that the base station receives on the scheduling time-frequency resource data transmitted by the terminal, detect in the MU-MIMO mode and the non-orthogonal multiple access mode, the data transmitted by the terminal, to confirm the data transmitted by the terminal.

In some embodiments of the present disclosure, the allocation module is further configured to perform, in a Pattern Division Multiple Access (PDMA) mode, the data transmission of the terminals in an identical group on the scheduling time-frequency resource.

For convenience of description, the parts and functions of the above device are described by modules and units. Of course, in the embodiments of the present disclosure, the functions of the modules and units may be implemented in one or more software and hardware.

The embodiments of the present disclosure will be described in the following.

Figure 5:
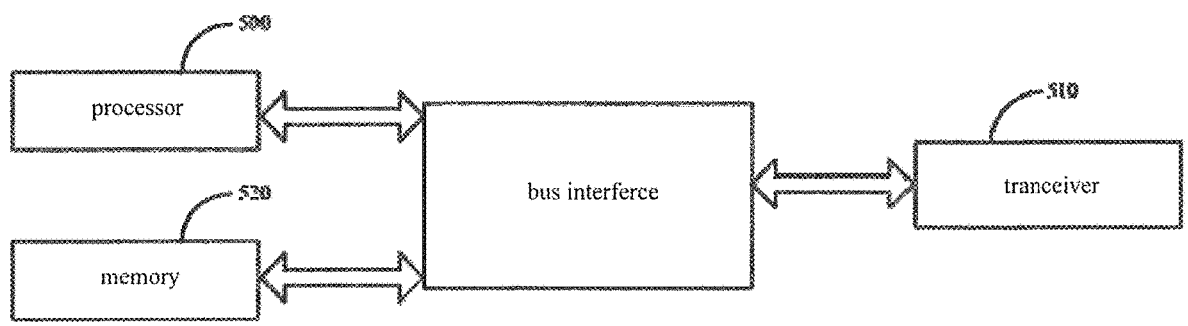
FIG. 5 is a schematic view of a communication device in some embodiments of the present disclosure.

FIG. 5 is a schematic view of a communication device in some embodiments of the present disclosure. As shown in FIG. 5, the device includes:

a processor 500, configured to read a program stored in a memory 520 to: group terminals based on channel spatial characteristics of the terminals; allocate data transmission modes to the terminals, wherein data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode;

a transceiver 510, configured to transmit data under a control of the processor to transmit and receive data during a data processing process.

In some embodiments of the present disclosure, in the case of performing the data transmission of the terminals in different groups on the identical scheduling time-frequency resource and in the MU-MIMO mode, the terminals in the identical group using different non-orthogonal multiple access resources have identical or similar Multiple-Input Multiple-Output (MIMO) precodes or beamforming on a time-frequency resource.

In some embodiments of the present disclosure, in the case of performing the data transmission of the terminals in the identical group in the non-orthogonal multiple access mode, the method further includes: allocating different non-orthogonal multiple access resources to the terminals in the identical group; instructing, through signaling information, the terminals in the identical group to use different non-orthogonal multiple access resources.

In some embodiments of the present disclosure, the method further includes: in the case that a base station transmits data on the scheduling time-frequency resource and in the data transmission mode allocated to the terminals, indicating non-orthogonal multiple access transmission information of the terminals through signaling information in the case that the terminals in the identical group share an identical Demodulation Reference Signal (DMRS) port; or in the case that the terminals in the identical group use different DMRS ports, indicating non-orthogonal multiple access transmission information of the terminals through signaling information or indicating the non-orthogonal multiple access transmission information of the terminals through DMRS signals.

In some embodiments of the present disclosure, the method further includes: in the case that the base station transmits data to the terminals on the scheduling time-frequency resource and in the non-orthogonal multiple access mode, detecting in the non-orthogonal multiple access mode by the terminals, the data transmitted to the terminals, to confirm the data transmitted to the terminals.

In some embodiments of the present disclosure, in the case that the terminals detect in the non-orthogonal multiple access mode the data transmitted to the terminals, the method further includes: processing the data transmitted to the terminals in other groups on the scheduling time-frequency resource by the base station as interferences.

In some embodiments of the present disclosure, the method further includes: in the case that the base station receives on the scheduling time-frequency resource data transmitted by the terminal, detecting in the MU-MIMO mode and the non-orthogonal multiple access mode by the base station, the data transmitted by the terminal, to confirm the data transmitted by the terminal.

In some embodiments of the present disclosure, the non-orthogonal multiple access mode is a Pattern Division Multiple Access (PDMA) mode.

In FIG. 5, the bus architecture may include any number of interconnected buses and bridges, specifically one or more processors represented by the processor 500 and various circuits of the memory represented by the memory 520 are linked together. The bus architecture may also link various other circuits such as peripherals, voltage regulators, power management circuits, and the like, which are well known in the art and therefore will not be further described herein. The bus interface provides the interface. The transceiver 510 may be a number of elements, including transmitters and transceivers, providing units for communicating with various other devices over a transmission medium. The processor 500 is responsible for managing the bus architecture and general processing, and the memory 520 may store data used by the processor 500 when performing operations.

In summary, the technical solution of the present disclosure is an application mechanism that combines a large-scale antenna technology and a non-orthogonal multiple access technology and is applicable to the uplink and the downlink of the communication system. To be specific, the base station side groups terminals based on the channel spatial characteristics of the terminals, and the terminals whose channel characteristics are close to each other (that is, the spatial isolation is low) are arranged into a group, and the terminals whose channel characteristics are relatively different (that is, the spatial isolation is high) are arranged into different groups.

The base station side performs uplink/downlink scheduling of the terminal, and the pairing of the terminals follows the following principles: a) the pairing of terminals in different groups is performed in the MU-MIMO mode; b) the pairing of terminals in the same group is performed in the non-orthogonal multiple access mode; c) the non-orthogonal multiple access resources are allocated to different groups independently.

When the base station transmits data:

The transmitting side: performs the MU-MIMO precoding on the downlink transmission based on the channel characteristic matrix of the inter-group terminals based on the scheduling result. The intra-group terminals different non-orthogonal multiple access resources based on the MU-MIMO precoding of the downlink.

The receiving side: when receiving uplink data, a joint detection of MU-MIMO and PDMA is performed based on a channel matrix of multiple terminals scheduled on the same time-frequency resource.

When the base station receives data:

The transmitting side: the uplink transmission is performed based on the scheduling result. The intra-group terminals use different non-orthogonal multiple access resources based on the MU-MIMO precoding of the uplink.

The receiving side: if a non-orthogonal multiple access method is used, the data of the terminal is detected in the non-orthogonal multiple access detection mode, and the terminal data of other groups is processed as interferences.

According to the embodiments of the present disclosure, it is able to combine the large-scale antennas and the non-orthogonal multiple access technologies effectively, thereby improving the spectrum efficiency of the system at the utmost extend in the case of minimizing the scheduling complexity and the receiving complexity as much as possible.

Those skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware aspects. Furthermore, the present disclosure may take the form of a computer program product embodied on one or more computer-usable storage media (including but not limited to disk storage, optical storage, etc.) having computer-usable program code embodied therein.

The present disclosure is described with reference to flowcharts and/or block diagrams of the method, the device (system), and the computer program product based on the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine for use in generating instructions for execution by a processor of a computer or other programmable data processing device. A device that implements the functions specified in one or more blocks of a flowchart or multiple flows and/or block diagrams of a flowchart.

The computer program instructions may also be stored in a computer readable memory capable of directing a computer or other programmable data processing device to operate in a specific mode so that instructions stored in the computer readable memory produce an article of manufacture including the command device. The apparatus implements the functions specified in one or more blocks of one or more processes and/or block diagrams of the flowchart.

These computer program instructions can also be loaded onto a computer or other programmable data processing device such that a series of operational steps are performed on the computer or other programmable device to generate computer-implemented processes for execution on a computer or other programmable device. The instructions provide steps for implementing the functions specified in one or more blocks of a flowchart or a plurality of flowcharts and/or block diagrams of a flowchart.

Obviously, a person skilled in the art may make further modifications and improvements without departing from the principle of the present disclosure, and these modifications and improvements shall also fall within the scope of the present disclosure.

What is claimed is:

1. A method for determining a multi-user transmission mode, comprising:
    grouping terminals based on channel spatial characteristics of the terminals; and
    allocating data transmission modes to the terminals, wherein data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode, wherein the non-orthogonal multiple access resources are allocated in a code word domain by using a pattern division multiple access (PDMA) mode;
    wherein the terminals in the identical group use different demodulation reference signal (DMRS) ports, the method further comprises indicating non-orthogonal multiple access transmission information of the terminals in the identical group through DMRS signals;
    wherein in the case of performing the data transmission of the terminals in different groups on the identical scheduling time-frequency resource and in the MU-MIMO mode, the terminals in the identical group using different non-orthogonal multiple access resources have identical Multiple-Input Multiple-Output (MIMO) precodes or beamforming on a time-frequency resource.

2. The method according to claim 1, wherein in the case of performing the data transmission of the terminals in the identical group in the non-orthogonal multiple access mode, the method further comprises:
    allocating different non-orthogonal multiple access resources to the terminals in the identical group;
    instructing, through signaling information, the terminals in the identical group to use different non-orthogonal multiple access resources.

3. The method according to claim 1, further comprising:
    in the case that the base station transmits data to the terminals on the scheduling time-frequency resource and in the non-orthogonal multiple access mode, detecting in the non-orthogonal multiple access mode by the terminals, the data transmitted to the terminals, to confirm the data transmitted to the terminals.

4. The method according to claim 3, wherein in the case that the terminals detect in the non-orthogonal multiple access mode the data transmitted to the terminals, the method further comprises:
    processing the data transmitted to the terminals in other groups on the scheduling time-frequency resource by the base station as interferences.

5. The method according to claim 1, further comprising:
    in the case that the base station receives on the scheduling time-frequency resource data transmitted by the terminal, detecting in the MU-MIMO mode and the non-orthogonal multiple access mode by the base station, the data transmitted by the terminal, to confirm the data transmitted by the terminal.

6. A device for determining a multi-user transmission mode, comprising a processor configured to read a program stored in a memory to:
    group terminals based on channel spatial characteristics of the terminals; and
    allocate data transmission modes to the terminals, wherein data transmission of the terminals in different groups is performed on an identical scheduling time-frequency resource and in a Multi-User Multiple-Input Multiple-Output (MU-MIMO) mode, and data transmission of the terminals in an identical group is performed on the scheduling time-frequency resource and in a non-orthogonal multiple access mode, wherein non-orthogonal multiple access resources are allocated in a code word domain by using a pattern division multiple access (PDMA) mode;
    wherein the terminals in the identical group use different demodulation reference signal (DMRS) ports, the processor is configured to read the program stored in the memory to: indicate non-orthogonal multiple access transmission information of the terminals in the identical group through DMRS signals;
    wherein in the case of performing the data transmission of the terminals in different groups on the identical scheduling time-frequency resource and in the MU-MIMO mode, the terminals in the identical group using different non-orthogonal multiple access resources have identical Multiple-Input Multiple-Output (MIMO) precodes or beamforming on a time-frequency resource.

7. The device according to claim 6, wherein the processor is configured to read the program stored in the memory to:
    in the case of performing the data transmission of the terminals in the identical group in the non-orthogonal multiple access mode, allocate different non-orthogonal multiple access resources to the terminals in the identical group, and instruct, through signaling information, the terminals in the identical group to use different non-orthogonal multiple access resources.

8. The device according to claim 6, wherein the processor is configured to read the program stored in the memory to:
    in the case that the base station transmits data to the terminals on the scheduling time-frequency resource and in the non-orthogonal multiple access mode, detect in the non-orthogonal multiple access mode the data transmitted to the terminals, to confirm the data transmitted to the terminals.

9. The device according to claim 8, wherein the processor is configured to read the program stored in the memory to, in the case that the terminals detect in the non-orthogonal multiple access mode the data transmitted to the terminals, process the data transmitted to the terminals in other groups on the scheduling time-frequency resource by the base station as interferences.

10. The device according to claim 6, wherein the processor is configured to read the program stored in the memory to:

in the case that the base station receives on the scheduling time-frequency resource data transmitted by the terminal, detect in the MU-MIMO mode and the non-orthogonal multiple access mode, the data transmitted by the terminal, to confirm the data transmitted by the terminal.

11. The device according to claim 6, wherein the processor is configured to read the program stored in the memory to perform, in the PDMA mode, the data transmission of the terminals in an identical group on the scheduling time-frequency resource.

* * * * *